FIG. I

United States Patent Office 3,631,118
Patented Dec. 28, 1971

3,631,118
ISOPRENE FROM ETHYLENE USING OLEFIN DISPROPORTIONATION
Robert L. Banks, Bartlesville, Okla., assignor to Phillips Petroleum Company
Filed Jan. 8, 1970, Ser. No. 1,434
Int. Cl. C07c 3/62, 11/18
U.S. Cl. 260—680 R                                        7 Claims

ABSTRACT OF THE DISCLOSURE

A process of preparing isoprene from ethylene wherein ethylene and butadiene are codimerized to produce a branched acyclic diene, the branched acyclic diene is contacted with an olefin disproportionation catalyst in the presence of ethylene to produce the isoprene. The butadiene can conveniently be provided by the olefin disproportionation of propylene to provide ethylene and butenes, and subsequent dehydrogenation of the butenes.

BACKGROUND OF THE INVENTION

Field of the invention

This invention relates to the preparation of isoprene from ethylene. In a further aspect, the invention relates to a process for the preparation of isoprene from ethylene and butadiene.

Description of the prior art

The reaction of olefinic materials to produce other olefinic materials wherein the reaction can be visualized as the breaking of two existing double bonds between first and second carbon atoms, and between third and fourth carbon atoms, respectively, and the formation of two new existing bonds, such as between first and third carbon atoms and the second and fourth carbon atoms, respectively, and wherein the two existing double bonds can be on the same or different molecules, has been called "the olefin reaction." The olefin reaction can also be described mechanistically by visualizing two unsaturated pairs of carbon atoms combining to form a 4-center (cyclobutane) intermediate which then dissociates by breaking either set of opposing bonds. Other terms have been utilized to describe the reactions of olefinic materials which are within the scope of the olefinic reaction as defined above. These include such terms as "olefin disproportionation," "olefin dismutation," "transalkylidenation," and "olefin metathesis." Throughout this specification and claims, the term "olefin disproportionation" is used as a matter of choice, and is deemed to be equivalent to the above-mentioned terms, including "the olefin reaction."

Included among the reactions which fall within the scope of the term "olefin disproportionation," there is a reaction which employs ethylene as one of the reactants. That is, ethylene with its double bond, is one of the unsaturated pairs of carbon atoms which combines to form the 4-center (cyclobutane) intermediate with another unsaturated pair of carbon atoms on a different molecule. For example, ethylene and pentene-2 in the presence of an olefin disproportionation catalyst react to form butene-1 and propylene. Because of the fact that the larger molecule (pentene-2) has been broken to form the shorter molecules (butene-1 and propylene), this type of olefin disproportionation reaction has been called "ethylene cleavage." Another term which has been applied to this type of reaction is "ethenolysis." When the ethylene cleavage reaction is carried out in the presence of an olefin disproportionation catalyst in combination with a double bond isomerization catalyst, high conversions of olefinic feed materials to relatively low molecular weight olefinic products are obtained. This type of olefin disproportionation reaction has been called "exhaustive ethylene cleavage."

Numerous catalyst systems have been reported which effect the olefin disproportionation reaction, including the catalysts of U.S. 3,261,879, Banks (1966) and 3,365,513, Heckelsberg (1968).

The petrochemical industry today is seeking new ways to prepare isoprene from various petrochemical feedstocks. The art has developed ways of producing isoamylenes via olefin disproportionation chemistry. These isoamylenes are then subjected to dehydrogenation to produce isoprene. However, the art has heretofore not been able to develop a process of preparing isoprene utilizing ethylene as a feedstock.

OBJECTS OF THE INVENTION

It is an object of this invention to produce isoprene utilizing ethylene and butadiene as the feedstock.

It is a further object of this invention to produce isoprene using ethylene alone as the feedstock.

Additionally, it is an object to provide a desirable degree of flexibility to a butadiene manufacturing facility such that a single plant can produce both butadiene and isoprene in ratios of one to the other which correspond to the market demand.

Other objects and advantages of the present invention will be apparent from a reading of the following disclosure and the appended claims.

SUMMARY OF THE INVENTION

The process of preparing isoprene comprises codimerizing ethylene and butadiene to produce a methylpentadiene codimer and subjecting this branched codimer to a catalytic olefin disproportionation reaction in the presence of ethylene which exhaustively cleaves the branched codimers to isoprene. Propylene is a byproduct of this reaction.

Further in accordance with this invention, isoprene is prepared from ethylene alone by the process of disproportionating byproduct propylene to provide ethylene and butenes, and dehydrogenating the butenes to butadiene. Butadiene and feed ethylene are then fed to the codimerization unit to produce the methylpentadiene codimer mentioned above, the methylpentadiene codimer being passed to another olefin disproportionation unit wherein it is exhaustively cleaved in the presence of ethylene to isoprene. The ethylene cleavage of the codimer produces sufficient quantities of propylene to provide substantially all of the feed requirements for the propylene disproportionation step.

DETAILED DESCRIPTION OF THE INVENTION

Figure 1:
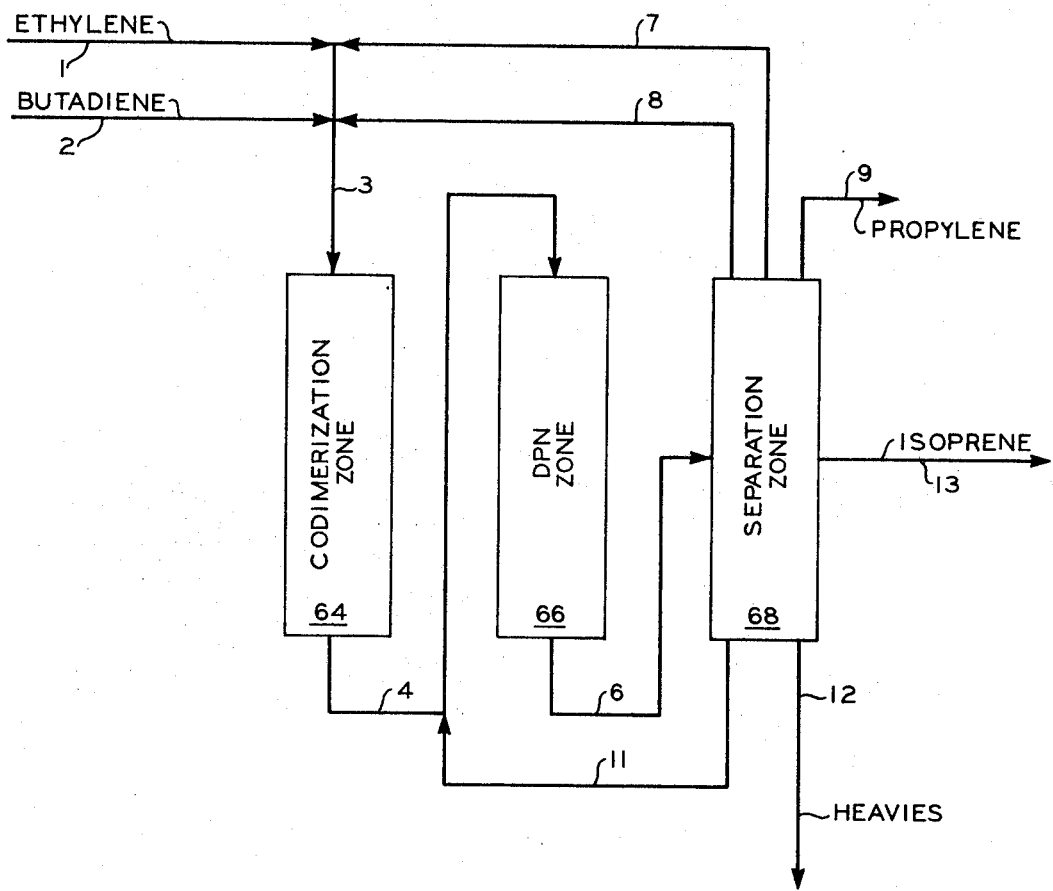
FIG. 1 of the drawing is a schematic flow diagram which illustrates the preparation of isoprene utilizing the olefin disproportionation and ethylene/butadiene codimerization steps.

The invention can best be understood by explanation of the drawings. Referring to FIG. 1, ethylene in line 1 and butadiene in line 2 ear introduced into codimerization zone 64 by way of line 3. Therein, a suitable codimerization catalyst promotes the conversion of the feed materials to methylpentadiene codimer, such as 3-methyl-1,4-pentadiene. Within zone 64, other byproducts including still different 1:1 addition products are formed such as 1,4-hexadiene, 1,3-hexadiene, cyclohexene, and linear butadiene dimers.

Some of the principal reactions which are believed to take place in the codimerization zone are:

(1)
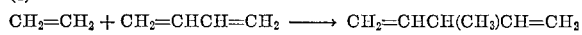

(2)
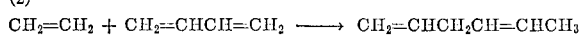

(3)

(4)

(5)
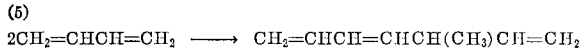

(6)
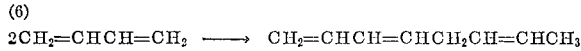

The effluent of the codimerization reaction is withdrawn via line 4 and passed to olefin disproportionation (DPN) zone 66. Unconverted ethylene from the codimerization reaction and unconverted butadiene are also subjected to the exhaustive ethylene cleavage reaction within zone 66. The olefin disproportionation of the effluent, containing a large proportion of ethylene, produces a variety of olefinic products including substantial amounts of isoprene. For best results, the molar ratio of ethylene to other olefins in the cleavage zone is at least 2:1 and preferably at least 4:1. The isoprene is the result of exhaustive ethylene cleavage of the branched polyenes such as the methylpentadiene codimer. The other principal product of this cleavage reaction is propylene. Within zone 66, substantial amounts of the other unbranched codimerization byproducts such as cyclohexene and the linear hexadienes are reconverted to butadiene.

Some of the principal reactions which are believed to take place in the exhaustive ethylene cleavage zone are:

(7)
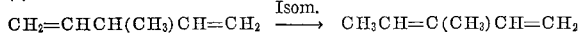

(8)
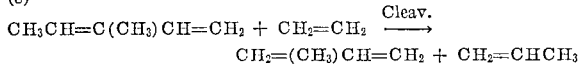

(9)
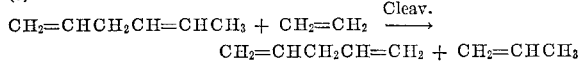

(10)
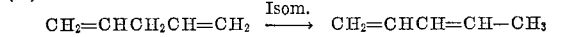

(11)
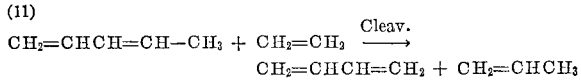

(12)
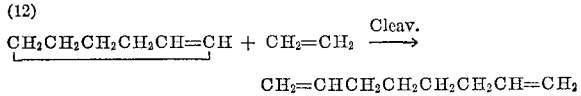

Reactions 7 and 8 illustrate the simultaneous double bond isomerization and ethylene cleavage of methyl-substituted dienes which take place to produce the desired isoprene product. Reactions 9, 10, and 11 illustrate the analogous manner in which other unbranched dienes are reconverted to butadiene for recycle. Unbranched trienes follow this same route. Reaction 12 illustrates the conversion of the cyclic olefin to the acyclic diene, which can then proceed to butadiene as in reactions 9, 10, and 11.

The effluent from disproportionation zone 66 is passed via line 6 to separation zone 68. Therein, ethylene and butadiene are separated and recycled via lines 7 and 8, respectively, to line 3 and to codimerization zone 64. By-product propylene is removed from the system via line 9. Unconverted codimerization products are returned to olefin disproportionation zone 66 by way of line 11. Heavier materials are removed from the process via line 12. Isoprene is passed from the separation zone 68 via line 13 and recovered as the product of the process.

In a modification of the process as depicted in FIG. 1, some or all of the propylene which is recovered as a byproduct of the process can be recycled to the olefin disproportionation zone 66 and utilized as a portion of the cleaving olefin. In this embodiment, butenes become a significant byproduct of the reaction within the disproportionation zone 66 and are recovered from separation zone 68 in any suitable manner.

Figure 2:
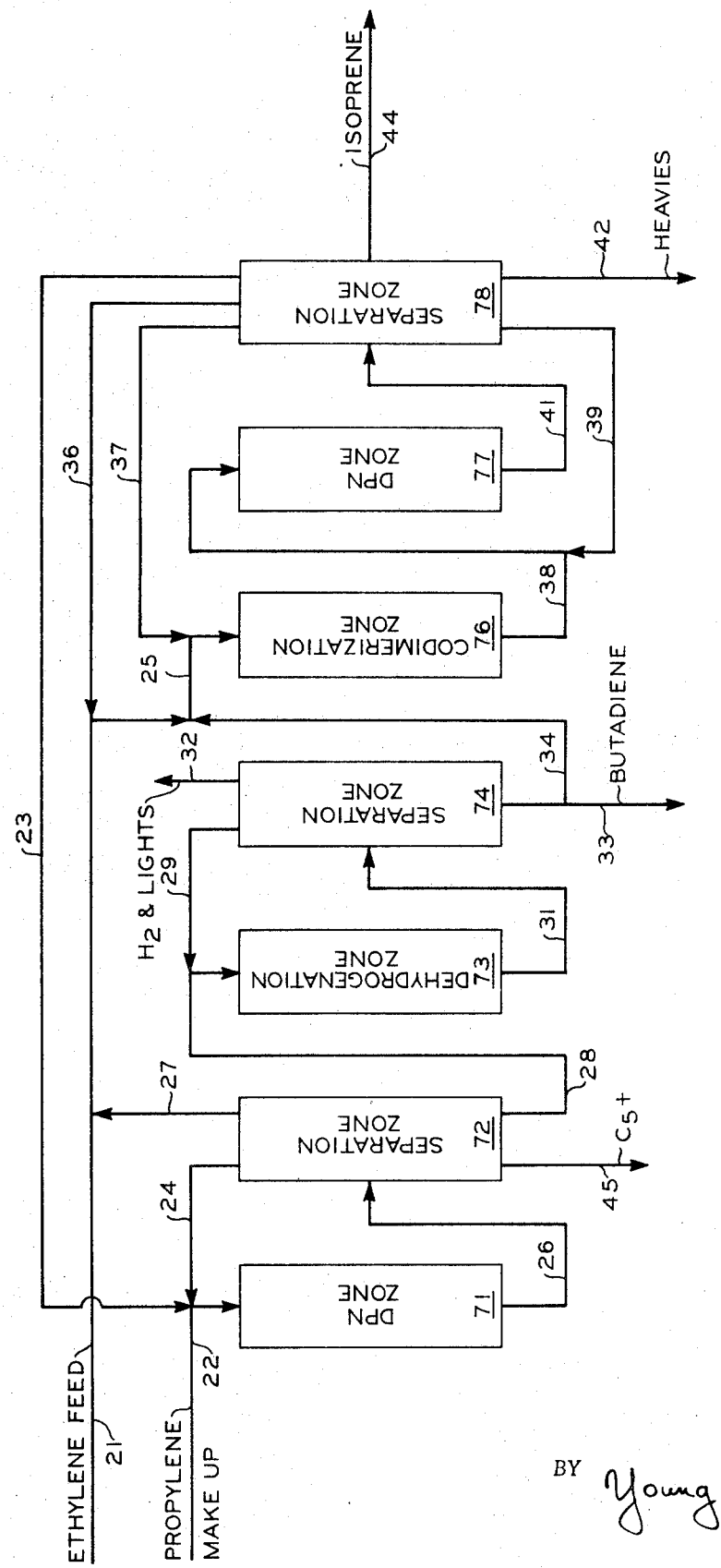
FIG. 2 of the drawing is a schematic flow diagram which illustrates the embodiment of the invention wherein isoprene is prepared utilizing ethylene alone as the feedstock.

A preferred embodiment of the invention wherein isoprene is produced utilizing ethylene as the feedstock is depicted in FIG. 2. FIG. 2 presents a schematic flow diagram wherein ethylene in line 21 is fed via line 25 into a codimerization zone 76. In line 25, the ethylene is admixed with butadiene from line 34 which is prepared within butene dehydrogenation zone 73. The propylene disproportionation zone 71 receives make-up propylene from line 22 and recycle propylene from separation zones 72 and 78 via lines 23 and 24. Within disproportionation zone 71, the propylene is converted to ethylene and butenes according to:

(13)
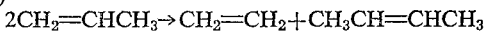

The effluent from the propylene disproportionation zone 71 is passed via line 26 into separation zone 72. From within zone 72, unconverted propylene is recycled to disproportionation zone 71 via line 24. Ethylene is carried overhead in line 27 into line 21 to provide a portion of the feed to the codimerization zone 76. Butenes are recovered in line 28 and passed to dehydrogenation zone 73. Any heavier hydrocarbons present in the effluent from the disproportionation zone 71 are passed from the system via line 45.

Within dehydrogenation zone 73, the butenes are converted to butadiene. The effluent from dehydrogenation zone 73 is carried by line 31 to separation zone 74. Therein, hydrogen and light materials are recovered via line 32 and passed from the system. Unconverted butenes are separated and recycled via line 29 to zone 73. Butadiene can be recovered as a valuable product of the process from separation zone 74 by way of line 33. Butadiene is also passed via line 34 into codimerization zone 76 wherein ethylene and butadiene are converted to codimers such as 3-methyl-1,4-pentadiene, 1,4-hexadiene, 1,3-hexadiene, cyclohexene, and butadiene oligomers as discussed above with respect to FIG. 1.

The entire effluent, containing the olefinic products and a substantial molar excess of ethylene from codimerization zone 76, is passed via line 38 into disproportionation zone 77 wherein the effluent is contacted with an olefin disproportionation-isomerization catalyst system. This reaction produces isoprene as a result of the ethylene cleavage of the methylpentadiene, while the exhaustive ethylene cleavage of the linear codimers, butadiene dimers, and other butadiene oligomers results in the regeneration of substantial amounts of butadiene. Another substantial product of the reaction within disproportionation zone 77 is propylene resulting from the ethylene cleavage reactions.

The effluent from the ethylene cleavage zone 77 is passed via line 41 into separation zone 78. Within separation zone 78, isoprene is recovered via line 44 and compounds heavier than butadiene oligomers are removed from the system via line 42 as heavies. The unconverted codimerization products are returned to olefin disproportionation zone 77 via line 39. Butadiene is recovered and recycled to the codimerization zone 76 via line 37. Ethylene is recovered and recycled to codimerization zone 76 via line 36. Propylene is recovered from separation zone 78 and passed via line 23 to line 22 and to propylene disproportionation zone 71 for conversion to ethylene and butenes.

As will be shown in greater detail in the illustrative examples, the system as depicted in FIG. 2 provides an efficient way of preparing isoprene from ethylene alone. The quantity of propylene produced in the system is sufficient to satisfy the feed requirements for the olefin disproportionation reactor 71. Therefore, only makeup propylene need be introduced via line 22 to the system. In addition, the quantities of propylene, ethylene and butenes produced are sufficient that enough butadiene is prepared in dehydrogenation zone 73 to produce some butadiene as an additional product of this embodiment of the process.

The step requiring the dehydrogenation of butenes to butadiene can be carried out by any suitable catalytic process. For example, dehydrogenation processes employing catalysts such as the well known iron-potassia-chromia catalysts, or a catalyst such as lithium-treated tin oxide-tin phosphate catalysts can be used.

The olefin disproportionation steps of the invention are carried out using suitable catalysts. Any catalyst having activity for olefin disproportionation reactions can be employed. These include solid (heterogeneous) and solution (homogeneous) catalysts, or combinations thereof. Suitable catalysts include those disclosed in U.S. Pat. 3,261,879, Banks (1963), U.S. 3,365,513, Heckelsberg (1968), and U.S. 3,448,163, Howman et al. (1969), and U.S. application Ser. No. 717,023, Zuech, filed Mar. 28, 1968, now U.S. Pat. 3,558,518, issued Jan. 26, 1971. Either solid or solution olefin disproportionation catalysts can be used for the propylene disproportionation steps. Solid catalysts are preferred for the ethylene cleavage disproportionation step.

Some examples of preferred olefin disproportionation catalysts are $WO_3/SiO_2$, $MoO_3/Al_2O_3$, $Mo(CO)_3/Al_2O_3$, $Re_2O_7/Al_2O_3$, $WO_3/AlPO_4$, $WO_3/Al_2O_3$, and the like and mixtures thereof.

In that olefin disproportionation step of the process wherein the effluent from the codimerization reaction is exhaustively cleaved with ethylene, the olefin disproportionation catalyst is utilized in conjunction with or association with a suitable double bond isomerization catalyst such as, for example, magnesium oxide. The presence of the double bond isomerization catalyst greatly increases the conversion to the desired isoprene and butadiene. A particularly suitable combined catalyst for this step of the process is silica-supported tungsten oxide combination with magnesium oxide in the form of a mixed bed in which the MgO is present in amounts of 1–20 parts MgO per part $WO_3/SiO_2$ by weight.

Because of the wide variety of catalysts available for use in the olefin disproportionation reaction, the temperatures, pressures, flow rates, molar ratios of catalyst to feed materials, and other operating conditions will vary over a broad range. The physical and chemical properties of the various components of the feedstream, the optimum temperature, pressure and contact times for the particular catalyst employed, all affect the operating conditions within the olefin disproportionation reactors and subsequent separation operations. The manipulation of these variables to optimize the utilization of the particular catalyst is within the skill of those in the art.

Any suitable reaction techniques can be employed to effect the olefin disproportionation reaction, such as fixed bed operation, fluidized bed operation, liquid phase batch continuous operations, and the like. Conventional methods can be utilized to separate the materials in the process streams, including fractionation, crystallization, adsorption, and the like. Fractionation is generally preferred where possible.

The catalyst which is used for the codimerization of ethylene and butadiene to produce the methylpentadiene codimer may be any catalyst which suitably effects the codimerization of these two feed components to the particular branched codimer. A particularly suitable catalyst is one which results from the admixture of ferric chloride, triethylaluminum, and triphenylphosphine, wherein the P/Fe molar ratio is 1–2, the Al/Fe molar ratio is 3–5, and the ethylene pressure is about 500–150 lbs./in.$^2$ g. when the reaction is effected in the liquid phase at a temperature of 68–86° F.

The ethylene and butadiene which are employed as the feed to the codimerization unit may be prepared by any method suitable in the art. A particularly suitable method for preparing ethylene and butadiene from naphthalene is disclosed in U.S. 3,345,285, Hutto et al. (1967). Although feed materials can sometimes be processed in a "crude" state, it is preferred that feed materials be suitably purified prior to the reactions within the steps of the invention.

The following illustrative example is presented in order to explain the invention; however, the data included herein should not be construed as limiting the scope of the invention.

ILLUSTRATIVE EXAMPLE I

Ethylene and butadiene are converted into isoprene according to the flow diagram as shown in FIG. 1. The codimerization unit 64 contains a catalyst comprising 36 parts by weight ferric chloride, 87 parts by weight triphenylphosphine and 93 parts by weight triethylaluminum. The reaction conditions include a temperature of 80° F., a pressure of 1,000 p.s.i.g., and a weight hourly space velocity of 12.

The ethylene cleavage unit 66 utilizes 40 parts by weight of 8 weight percent tungsten oxide on silica catalyst admixed with 240 parts by weight magnesium oxide. The tungsten oxide on silica/magnesia mixture is activated with air in an inert gas at 1100° F. for 5 hours and subsequently treated with carbon monoxide at 1100° F. for 15 minutes. Reaction conditions within the olefin disproportionation unit 66 include a reaction temperature of 725° F., a pressure of 500 p.s.i.g., and a space velocity of 11.

Table I presents a material balance showing the composition of the streams which are depicted within FIG. 1.

TABLE I

| Composition, wt. parts/hr. | Stream No. | | | | | | | | | |
|---|---|---|---|---|---|---|---|---|---|---|
| | 1 | 2 | 4 | 6 | 7 | 8 | 9 | 11 | 12 | 13 |
| Ethylene | 928 | | 1,623 | 1,000 | 1,000 | | | | | |
| Propylene | | | | 795 | | | 795 | | | |
| Butadiene | | 317 | 80 | 683 | | 683 | | | | |
| Isoprene | | | | 410 | | | | | | 410 |
| Methyl pentadiene | | | 360 | 36 | | | | 36 | | |
| Hexadiene | | | 545 | 55 | | | | 55 | | |
| Methyl heptatriene | | | 180 | 20 | | | | 20 | | |
| Octatriene | | | 100 | 10 | | | | | 10 | |
| Others | | | 40 | 40 | | | | | | 40 |
| Total | 928 | 317 | 2,928 | 3,049 | 1,000 | 683 | 795 | 121 | 40 | 410 |

Table I shows that 928 wt. parts/hr. of ethylene and 317 wt. parts/hr. of butadiene are converted to 410 wt. parts/hr. of isoprene. The process also provides 795 wt. parts/hr. of propylene.

ILLUSTRATIVE EXAMPLE II

The process of the invention wherein ethylene is converted into isoprene using the codimerization of butadiene and ethylene in combination with olefin disproportionation steps is shown by the following material balance. In accordance with FIG. 2, the codimerization zone 76 is operated at the same conditions as codimerization zone 64 mentioned above in Illustrative Example I. However, the catalyst comprises 54 parts of ferric chloride, 130 parts of triphenylphosphine, and 140 parts of triethylaluminum. Olefin disproportionation zone 77 is operated at the same conditions as olefin disproportionation zone 66 mentioned above in discussing Illustrative Example I. However, the catalyst composition comprises 60 parts of tungsten oxide on silica and 360 parts magnesia by weight.

The propoylene disproportionation zone 71 uses 100 parts by weight of a tungsten oxide on silica catalyst activated at 1000 to 1100° F. in flowing air for 5 hrs. The conditions for the conversion of propylene to ethylene and butenes in zone 71 are a temperature of 750° F., a pressure of 300 p.s.i.g., and a weight hourly space velocity of 30.

Dehydrogenation unit 73 uses 3600 parts by weight of a dehydrogenation catalyst comprising iron, potassium, and chromia, as described in U.S. 2,866,790, Pitzer (1958). The conditions within dehydrogenation zone 73 include a temperature of 1105° F., a pressure of 7 p.s.i.g. at the inlet, a gaseous hourly space velocity of hydrocarbon of 400, and the ratio of volumes of steam to volumes of hydrocarbon of 12/1.

The composition of the streams as depicted in FIG. 2 of the drawing are shown in Table II.

Table II illustrates that 992 wt. parts/hr. ethylene can be converted to 615 wt. parts/hr. of isoprene. The process additionally can produce 75 wt. parts/hr. of butadiene.

Reasonable variations and modifications of my invention are possible without departing from the spirit and scope thereof.

I claim:
1. A process of preparing isoprene from ethylene which comprises the steps of (a) codimerizing ethylene and butadiene to produce a stream comprising a methylpentadiene codimer, (b) olefin disproportionating said codimer in the presence of ethylene to produce a stream comprising isoprene.

2. A process according to claim 1 wherein step (a) also produces unbranched olefinic addition products; and step (b) also produces quantities of propylene.

3. A process according to claim 2 further including as step (c) separating the isoprene-containing stream to provide an ethylene recycle stream, a butadiene recycle stream, a propylene stream, an isoprene product stream, and an unconverted codimerization product stream.

4. A process according to claim 3 further including step (d) returning the ethylene recycle stream and the butadiene recycle stream to step (a), and step (e) returning the unconverted codimerization product stream to step (b).

5. A process according to claim 4 further including providing the butadiene for step (a) by the steps of (f) olefin disproportionation of the propylene produced by step (b), said olefin disproportionation provided a stream comprising ethylene and butenes, and (g) dehydrogenating the butenes to provide said butadiene.

6. A process according to claim 5 wherein ethylene produced in step (e) is utilized as at least a part of the ethylene feed to step (a).

7. A process according to claim 1 wherein the ratio of ethylene to other olefins in step (b) is at least 2 to 1.

TABLE II

| Composition, wt. parts/hr. | Stream No. | | | | | | | | | | | | | | | | | | | |
|---|---|---|---|---|---|---|---|---|---|---|---|---|---|---|---|---|---|---|---|---|
| | 21 | 22 | 23 | 24 | 26 | 27 | 28 | 29 | 31 | 32 | 33 | 34 | 36 | 37 | 38 | 39 | 41 | 42 | 43 | 44 |
| Ethylene | 992 | | | | 400 | 400 | | | | | | | 1,500 | | 2,441 | | 1,500 | | | |
| Propylene | | 0 | 1,200 | 1,800 | 1,800 | | | | | | | | | | | | 1,200 | | | |
| Butenes | | | | | 735 | | 735 | 1,720 | 1,720 | | | 475 | | 1,023 | 120 | | 1,023 | | | |
| Butadiene | | | | | | | | | 550 | | 75 | | | | | | | | | 615 |
| Isoprene | | | | | | | | | | | | | | | | | 615 | | | |
| Methylpentadiene | | | | | | | | | | | | | | | 540 | 54 | 54 | | | |
| Hexadiene | | | | | | | | | | | | | | | 817 | 81 | 81 | | | |
| Methylheptatriene | | | | | | | | | | | | | | | 270 | 30 | 30 | | | |
| Octatriene | | | | | | | | | | | | | | | 150 | 15 | 15 | | | |
| Others | | | | | | 65 | | | 185 | 185 | | | | | 52 | | 52 | 52 | 65 | |
| Total | 992 | 0 | 1,200 | 1,800 | 3,000 | 400 | 735 | 1,720 | 2,455 | 185 | 75 | 475 | 1,500 | 1,023 | 4,390 | 180 | 4,570 | 52 | 65 | 61 |

References Cited

UNITED STATES PATENTS 3,408,418  10/1968  Iwamoto et al. _____ 260—680

OTHER REFERENCES

Heckelsberg et al.: Diene Disproportionation Reactions. In J. Catalysis, vol. 13, pp. 99–100, January 1969.

PAUL M. COUGHLAN, JR., Primary Examiner

U.S. Cl. X.R.

260—680 B